INVENTORS
CHARLES J. ULRICK
CHARLES P. WOMACK
BY
Moody and Kintzinger
ATTORNEYS

INVENTORS
CHARLES J. ULRICK
CHARLES P. WOMACK
BY
Woody and Kintzinger
ATTORNEYS

United States Patent Office 3,413,571
Patented Nov. 26, 1968

3,413,571
KEYER/MODULATOR CIRCUIT FOR ENCODING GENERALIZED PERIODIC WAVEFORMS INTO PHASE SCRIPT

Charles J. Ulrick and Charles P. Womack, Marion, Iowa, assignors to Collins Radio Corporation, Cedar Rapids, Iowa, a corporation of Iowa Filed Nov. 3, 1965, Ser. No. 506,189
7 Claims. (Cl. 332—11)

ABSTRACT OF THE DISCLOSURE

A keyer-modulator circuit encoding generalized periodic waveforms into phase script receiving a data signal input and a clock driver reference signal and with these two signals in synchronous, with a signal inverter in a keyer circuit accepting existing logic levels followed by a signal level shifting stage selectively operable for offsetting the clock reference of the modulator above and below ground to select the clock phase to be transmitted.

Figure 1:
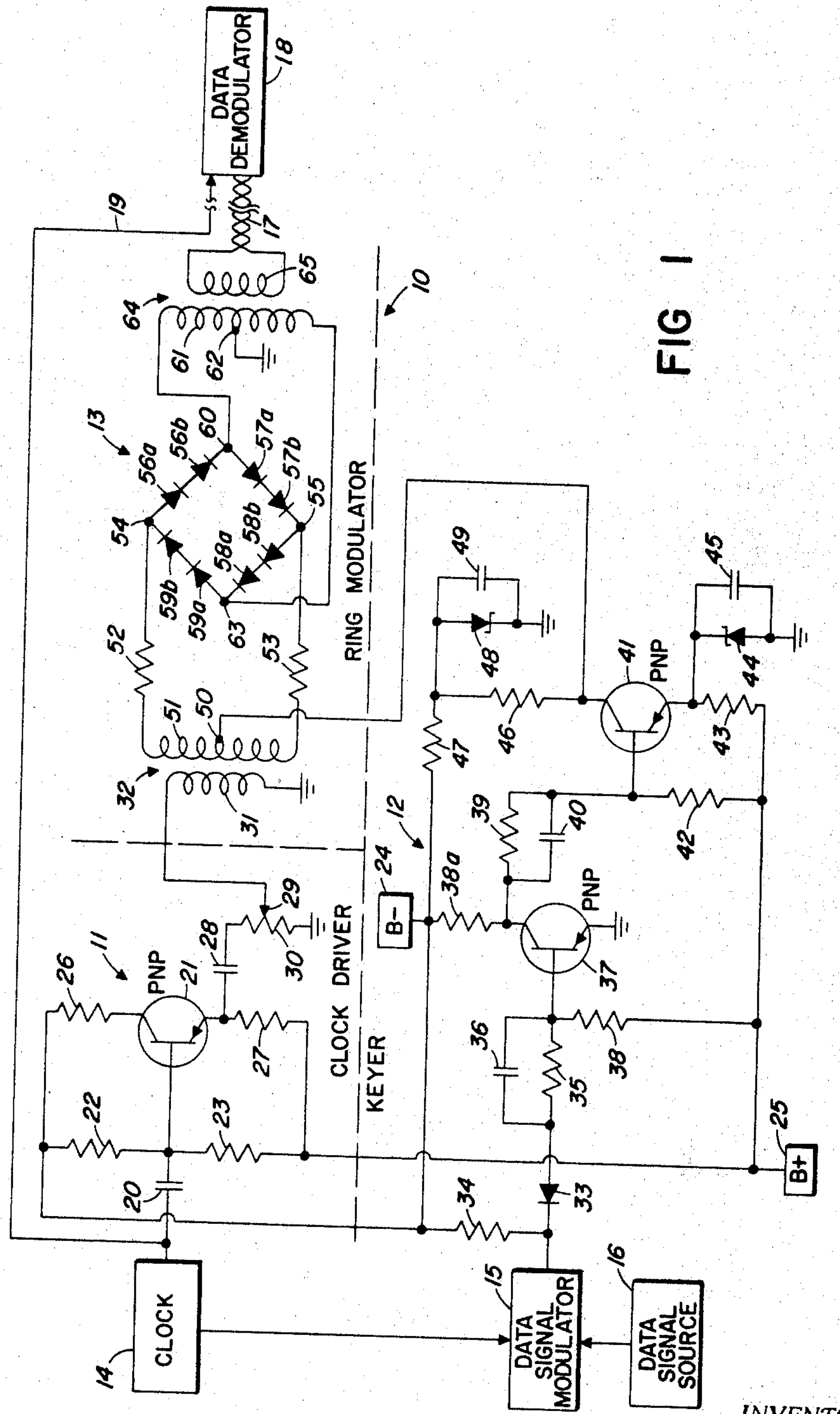

This invention relates in general to modulation encoding and transmission of intelligence, and in particular, to a phase script encoding keyer-modulator circuit using phase script encoding of periodic waveforms for providing efficient utilization of available signal power and giving quality data transmission over extended wire links in an extremely fast, relatively inexpensive and reliable data transmission system.

There has been, through recent years, an ever increasing requirement for efficient transmission of digital data between separate and isolated points or equipments at high speed, low cost, and with high reliability. Frequently equipments may comprise two or more computers in a satellite configuration, or a single computer and its associated input and/or output devices. Many such equipments are located at sites quite remote from each other with data interchange required over distances in the many hundreds of feet and even up into the thousands of feet. Various systems have been devised for data transmission under such conditions, one providing for data bit transfer rates of 40,000 bits per second over one-half mile, and another attains a transmission rate of approximately 50,000 bits per second over a transmission line distance of several miles. Such performance rates, however, fall far short of data modulation, transmission and detection at an intelligible level with high speed interchange transmission rates in excess of 2,000,000 bits per second over, for example, a 240 kc. channel twisted pair transmission line more than one-half mile in length. This is accomplished using circuits designed to utilize substantially all the remaining energy in each data pulse after distortion through and by the transmission medium. Further, while the clock, or reference, signal is passed through the same distortion producing media as the data pulses, a detector, in a receiving station of applicant's system, is required merely to compare the relative phase of two signals regardless of waveshape. Thus, the keyer-modulator must take commutated data and encode it in phase script for the system. For example, an output signal in phase with the master clock is, in a predetermined approach, the result of a logic ZERO input to the circuit and is classified as a logic ZERO in phase script. In the same fashion, an out-of-phase output is classified as a ONE.

It is, therefore, a principal object of this invention to provide phase script intelligence encoding for efficient utilization of available signal power.

Another object is to obtain quality data transmission over extended wire links in an extremely fast, relatively inexpensive and reliable data transmission system.

A further object is to provide a keyer-modulator circuit capable of being arranged to give an output signal in phase with a master clock signal as a logic ZERO signal in phase script and an out-of-phase output signal as a ONE signal in phase script.

Still another object is to provide such a circuit capable of encoding input data to phase script information bits, for transmission, at rates in excess of 2,000,000 bits per second.

Another object is to improve the signal-to-noise power ratio in transmitted intelligence through the use of phase inscription and with demodulation performed using synchronous detection with the received signal and noise compared to a reference voltage bearing an in-phase relationship to the signal and random phase relationship to the noise.

Features of this invention useful in accomplishing the above objects include in the keyer-modulator circuit, a clock driver section, a keyer section and a ring modulator section. The clock driver receives a reference signal from a clock signal source which also provides an imput to a data signal modulator circuit connected to receive an input from a data signal source. The output of the clock signal source is fed to the keyer circuit with a signal inverter, accepting existing logic levels, followed by a signal level shifting stage selectively operable for offsetting the clock reference of the modulator above and below ground to select the clock phase to be transmitted. For proper operation data input to the keyer circuit is maintained in proper phase with respect to the master clock signal with ONE to ZERO or ZERO to ONE transitions of data occurring substantially during or near the zero crossings of the master clock signal. The clock driver circuit is used to drive a clock signal transformer in the ring modulator circuit and for minimized loading of the clock signal source. In the ring modulator section four diode pairs arranged in a ring bridge circuit are driven from a balanced clock signal input transformer and drive a balanced output transformer. The diode ring bridge circuit is arranged so that offsetting of the clock signal input transformer above or below ground reference causes respectively, alternately, two of the four pairs of diodes to conduct providing the respective controlled phase of the clock signal to be passed to the output transformer.

A specific embodiment representing what is presently regarded as the best mode for carrying out the invention is illustrated in the accompanying drawings.

Figure 2:
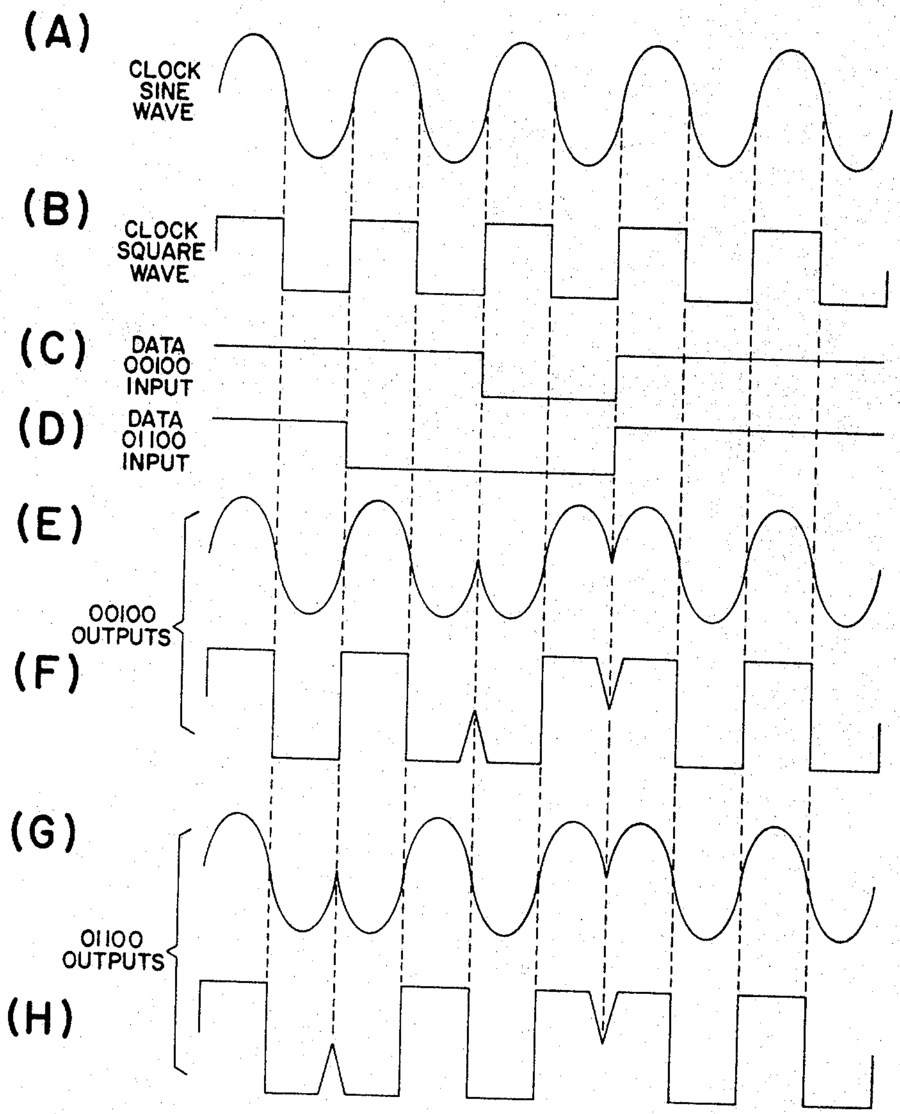

In the drawings:

FIGURE 1 represents a combination system block and keyer modulator schematic; and FIGURE 2, a familly of curves including a sinusoidal clock signal source curve A and, alternately, a square wave clock signal source curve B, two different data input waveforms C and D, phase output waveforms E and F resulting from data waveform C phase script modulation on, respectively, clock signal waveforms A and B, and curves G and H resulting from data waveform D phase script modulation on, respectively, clock signal waveforms A and B.

Referring to the drawings:

The keyer-modulator circuit 10 is shown in a phase script modulated intelligence transmission system to include a clock driver section 11, a keyer section 12 and a ring modulator section 13. The clock driver section 11 is connected to receive a master clock input signal from a master clock signal source 14 also providing a master clock reference signal to a data signal modulator circuit 15. A data signal source 16 is also connected to provide a data signal input to the data signal modulator circuit 15 and an output connection from circuit 15 to the keyer section circuit 12. At the output end the ring modulator section circuit 13 is shown to have an output connection through twisted pair line 17 to a data demodulator circuit 18 at a remote location. Clock 14 also has a connection through line 19 as a clock reference input source to the data demodulator circuit 18. It should be noted that there are various ways that the basic clock reference signal may be passed to a data demodulator circuit 18 station other than through line 19 as shown. These could be various combination circuits such as simplex or phantom circuits, as are well known in the art, or directly through the twisted pair line 17 with the clock reference signal detected from the transmitted phase script intelligence modulated carrier signal and used for demodulating intelligence from the transmitted signal.

The reference signal output from master clock signal source 14 is passed to the clock driver section circuit 11 through capacitor 20 to the base of a PNP transistor 21 connected as an emitter follower stage. The common connection of capacitor 20 and the base of transistor 21 is also a common junction of resistors 22 and 23 connected at the other ends to B− voltage supply 24 and B+ voltage supply 25, respectively. The collector of transistor 21 is also connected through resistor 26 to B− voltage supply 24, and the emitter is connected through resistor 27 to B+ voltage supply 25. The output connection of transistor 21, as an emitter follower stage, is from the emitter through capacitor 28 to an adjustable tap 29 equipped resistor 30 connected at its other end to ground. The adjustable resistor tap 29 is, in turn, connected to one end of transformer coil 31, and through the coil 31 to ground, with coil 31 being the primary coil of the clock signal input transformer 32 of ring modulator section circuit 13.

The output connection of data signal modulator circuit 15 is to the cathode of diode 33 of keyer section circuit 12. A diode 33 cathode bias connection is also provided through resistor 34 to B− voltage supply 24 for desired diode operational signal conduction. The anode of diode 33 is connected through resistor 35 and capacitor 36, in parallel, to the base of PNP transistor 37. The common junction of resistor 35, capacitor 36, and the base of transistor 37 is provided with a bias connection through resistor 38 to B+ voltage supply 25. The emitter of transistor 37 is connected to ground while the collector is connected through resistor 38A to B− voltage supply 24, and the collector is provided with an output connection through resistor 39 and capacitor 40, in parallel, to the base of PNP transistor 41. The base of transistor 41 is also provided with a bias connection through resistor 42 to B+ voltage supply 25. The emitter of transistor 41 is connected through resistor 43 to B+ voltage supply 25, and also through Zener diode 44 and capacitor 45, in parallel, to ground, and with the Zener diode 44 connected in the circuit cathode to emitter and anode to ground. The collector of transistor 41 is connected serially through resistors 46 and 47 to B− voltage supply 24, and the common junction of the resistors 46 and 47 is connected through Zener diode 48 and capacitor 49, in parallel, to ground, and with the cathode of diode 48 directly connected to ground.

The collector of transistor 41 is also connected as the output connection of the keyer section 12 to the center tap connection 50 of the balanced secondary coil 51 of clock signal input transformer 32 in ring modulator section circuit 13. The opposite ends of coil 51 of transformer 32 are connected through substantially equal value resistors 52 and 53 to opposite terminals 54 and 55, respectively, of eight diode, by four pairs, ring circuit with the diodes 56A, 56B, 57A, 57B, 58A, 58B, 59A and 59B arranged successively from terminal 54 in anode to cathode orientation clockwise around the ring circuit back to terminal 54. The common junction terminal 60 of diodes 56B and 57A is connected to one end of a balanced transformer coil 61 having a center tap connection 62 to ground while the common junction 63 of diodes 58B and 59A, opposite in the ring circuit from junction 60, is connected to the other end of the balanced transformer coil 61. Balanced coil 61 is a signal input coil of a balanced output transformer 64 having an output coil 65 with opposite end connections to the two wires at one end of twisted pair phase script encoded clock signal transmission line 17.

The keyer-modulator circuit 10 is quite useful in a data transmission system employing phase shift data encoding. The ultimate output to twisted pair transmission line 17 resulting from a clock reference input signal and a data signal input frequency related to the clock reference signal is an output signal having either a 0 degree or 180 degree phase relation to the master clock reference signal. The phase relation in this signal can be reversed or keyed at substantially any rate up to the fundamental of the master clock reference frequency. This means that at least one complete cycle of the clock reference signal will be available for determination of phase relations at a receiver such as data demodulator 18. For purposes of logic, an output signal of 0 degree phase is called a ZERO while one of 180 degree phase is a ONE, although this obviously is an arbitrary choosing as a matter of convenience. Master clock signal source 14 supplies a continuous carrier signal of arbitrary waveshape such as clock sine waveform A or, alternately, clock square waveform B, of FIGURE 2, or any other periodic function waveform which may be used with substantially equally good results provided its energy after modulation is not significantly different from that of a modulated clock sine waveform. The clock reference signal is fed to and through the emitter follower stage transistor 21. This provides appropriate signal input to resistor 30 with the resistor tap 29 adjustable to allow a signal level adjustment of from 0 to 5 volts peak to peak of the clock carrier signal input to the ring modulator transformer 32. Thus, an adjustment is provided for obtaining the desired amount of modulated carrier signal in the output twisted pair transmission line 17. While the clock driver emitter follower circuit is used primarily to drive the clock signal input transformer 32, the emitter follower transistor 21 does act as a buffer minimizing output loading of the clock signal source 14.

In the keyer circuit 12 transistors 37 and 41 and their circuit environment form a logic inverter stage useful in buffering the data from standard logic voltage levels to special bipolar +5 voltage levels desired at the output from the keyer circuit. Zener diodes 44 and 48 establish +5 and −5 voltage levels for the emitter and collector circuit portions, respectively, of transistor 41. When transistor 37 is biased to conduction by a −3 volts input signal level, −3 volts and 0 volt levels being standard logic signal levels used as a matter of convenience uniformly with many various computer equipments and stations, the base of transistor 41 is pulled above the +5 voltage level at its emitter and transistor 41 is turned off. The collector load resistor 46 as connected through resistor 47 to B− voltage supply 24 and as stabilized by Zener diode 48 results in the keyer output voltage level being pulled down to and stabilized at substantially the −5 voltage level. In the other case, when the 0 voltage input signal level is applied, transistor 37 is shut off and the DC path from B− voltage supply 24 through resistors 38 and 39 applies such a negative voltage at the base of transistor 41 and supplies sufficient base current to the transistor 41 that it is turned on. This results in the collector output of transistor 41 being brought up to substantially the emitter potenial voltage level of +5 volts. Hence, input data logic voltage levels of −3 volts and 0 volts are converted to keying levels of −5 volts and +5 volts by the transistor 37 and transistor 41 keying circuit 12.

The keying control phase script modulating −5 and +5 voltage levels are fed from the collector of transistor 41 to the center tap 50 of the balanced secondary coil 51 of clock signal input transformer 32 of the diode ring modulator circuit including transformers 32 and 64 and diodes 56A through 59B. A +5 volt keying voltage level passes through the relatively low DC resistance of the two halves of the secondary coil 51, the relatively low resistance value resistors 52 and 53, overcomes the bias to conduction values of the diodes in two legs of the diode ring circuit, and through the relatively low DC resistance of the two halves of center tapped and grounded balanced transformer coil 61 of output transformer 64. With such a positive 5 volt keying level input the diode pair diodes 56A and 56B are biased to conduction in one leg and diodes 58A and 58B are biased to conduction in an opposite leg of the diode ring circuit. This results in coils 51 and 61 of the input transformer 32 and the outputter transformer 64, respectively, being connected top to top and bottom to bottom and a signal passes through the series combination of transformer coils without inversion. However, whenever the −5 volt phase script key control voltage level input is applied to center tap 50 of the balanced coil 51 of transformer 32, diode pair diodes 59A and 59B in another leg of the diode ring circuit and diodes 57A and 57B of the respective opposite diode pair leg of the diode ring circuit are biased to conduction to result in coils 51 and 61 and the transformers 32 and 64 being connected in inverted relation. While a 1:1 ratio is used between the single coil and each half of the center tapped coils of transformers 32 and 64 other ratios could be employed just so long as the tapped coils 51 and 61 are substantially balanced coils.

It should be noted that it is particularly important that the data input to the keying circuit 12 be in proper phase relation with respect to the master clock signal with ONE to ZERO and ZERO to ONE transitions of data. These data signal transitions optimize operational results when made to occur substantially during or very near the ZERO crossings of the master clock signal as may be seen by the aligned relation between input signal transitions as shown by data input waveforms C and D in relation to aligned ZERO crossings of clock waveforms whether they be sinusoidal or square wave waveforms A or B as shown in FIGURE 2.

Waveforms E and F are the desired phase script encoded output waveforms resulting from phase script modulation of data waveform C on, respectively, clock signal waveforms A and B. The G and H waveforms are a similar result from phase script modulation of data signal waveform D on clock signal waveforms A and B, respectively. In essence, a fundamental periodic waveform is phase modulated producing a total shift in phase of 180 degrees for a data logic ONE and no shift in phase for a data logic ZERO. This is accomplished by either of the two typical data words modulating either the sine wave or square wave clock signal shown to provide the four alternate output waveforms shown. While a sine wave is easily generated for use as a clock encoding wave, any periodic function such as a square wave or triangular wave, and other periodic waveforms may be used with equally good results provided the energy spectrum in the resulting output waveform after modulation is not significantly different from the resulting output waveform of a signal modulated clock sine wave. This is a practical requirement in order to avoid excessive operational transmitted signal power loss and particularly so when transmission media is employed that has significant bandwidth limitations.

Components and values used in a keyer-modulator circuit for encoding generalized periodic waveforms into phase script with intelligence bit rate capabilities exceeding 2,000,000 bits per second according to applicants' teaching include the following:

| | |
|---|---|
| Clock reference frequency | 2.2 mc. |
| Twisted pair transmission line **17** over one-half mile long having a bandwidth of approximately 240 kc. | 24 gauge with PVC dielectric. |
| Capacitor **20** | 0.01 μf. |
| PNP transistors **21**, **37** and **41** | 2N964. |
| Resistors **22** and **23** | 6.8K ohms. |
| B− voltage supply **24** | −20 volts. |
| B+ voltage supply **25** | +20 volts. |
| Resistor **26** | 820 ohms. |
| Resistor **27** | 1K ohm. |
| Capacitor **28** | 0.1 μf. |
| Adjustable resistor **30** | 500 ohms. |
| Transformers **32** and **64** | 1:1 ratio from the single coil to each half of the center tap coil with a 0.6 mh. factor from single coil to each center tap coil half. |
| Diode **33** | 1N270. |
| Resistor **34** | 6.8K ohms. |
| Resistor **35** | 820 ohms. |
| Capacitor **36** | 220 pf. |
| Resistor **38** | 18K ohms. |
| Resistor **38A** | 2.2K ohms. |
| Resistor **39** | 5.6K ohms. |
| Capacitor **40** | 100 pf. |
| Resistor **42** | 10K ohms. |
| Resistor **43** | 1K ohm. |
| Zener diodes **44** and **48** | 1N751. |
| Capacitors **45** and **49** | 6.8 μf. |
| Resistor **46** | 470 ohms. |
| Resistor **47** | 1K ohm. |
| Resistors **52** and **53** | 150 ohms. |
| Diodes **56A** through **59B** | 1N4310. |

It should be noted that while diode pairs are used in each leg of the diode ring circuit to allow for the development of greater signal levels than is possible with single diodes, the system could be made to work with single diodes in each leg of the diode ring circuit. The double paired diode leg approach is used since excessive signal levels could cause single diode non-conductive legs, with respect to a particular data signal input, to conduct in reverse in which case the modulation for that particular signal would very likely be destroyed. It should also be realized that while a particular specific keyer circuit is illustrated, it would be possible to have a working system where two data voltage signal input levels were used and perhaps directly applied to the ring circuit, or possibly the voltage spread between the data input signal voltages could be increased by an appropriate amplification system and applied to the ring modulator circuit. For such an approach to be operationally usable, center tap 62 of the coil 61 of transformer 64 would have to be connected to a DC voltage supply at a voltage level approximately half way between the data signal input voltage levels applied for modulation to the ring modulator circuit. Such an arrangement could also require a low AC resistive path presumably through a capacitor from tap 62 to ground, detail not shown.

Thus, there is hereby provided a keyer-modulator circuit capable of accepting commutated data and encoding it into phase script for transmission line transmission to a remote station. It provides a phase script encoded output signal in phase with a master clock reference signal with a logic ZERO input to the circuit classified as a logic ZERO in the phase scripted output and with an out-of-phase output classified as a ONE. The ring modulator circuit utilizes four diode pairs in a ring configuration driven from a balanced clock signal source circuit and driving a balanced output circuit referenced to ground. Offsetting the clock source above or below ground reference causes two of the pairs of diodes to conduct and the conducting diodes couple the required phase of the clock to the output. A clock driver circuit is employed using a simple emitter follower circuit driving a clock signal input transformer to the ring modulator circuit and with the clock driver circuit insuring reduced output loading of the master clock reference signal source. The keyer circuit of the illustrated embodiment accepts existing logic levels followed by a voltage level shifting stage capable of offsetting the clock reference signal in the modulator above and below ground for selecting the appropriate clock phase to be transmitted as a phase script modulated signal. It should also be realized that a signal power amplifier, or amplifiers, may be employed as required between the output of keyer-modulator circuit 10 and data demodulator circuit 18, detail not shown.

Whereas this invention is here illustrated and described with respect to a specific embodiment thereof, it should be realized that various changes may be made without departing from the essential contribution to the art made by the teachings hereof.

We claim:

1. In a phase script encoding modulator circuit for phase script encoding of predetermined waveforms, a four leg ring circuit with each leg including unidirectional current flow means arranged in a common current flow direction around the four leg ring circuit, and at least four ring circuit terminals each positioned between two of the legs of the ring circuit; a signal input transformer having a primary coil, and a balanced center tapped secondary coil with opposite ends connected to a first opposite pair of ring circuit terminals; a signal output transformer having a balanced center tapped coil with opposite ends connected to a second opposite pair of ring circuit terminals, and an output coil connected to output signal conveying means; predetermined waveform reference signal generating means with signal connective means to the primary coil of said signal input transformer; a data signal input circuit connected to receive a timing reference signal from the predetermined waveform reference signal generating means, and to receive data signal input from a data signal source supplying two data signal levels; said data signal input circuit having an output carrying two data signal levels that as a waveform are synchronous with the predetermined waveform reference signal; synchronized data signal conveying means connected to the output of said data signal input circuit and connected for supplying two data signal voltage levels to the center tap of the balanced secondary coil; with the center tapped coil of the signal output transformer having a center tap connection to a voltage potential reference source at a voltage level substantially half way between the two data signal voltage levels applied at the center tap of the balanced secondary coil of the signal input transformer; wherein the unidirectional current flow means in the legs of said four leg ring circuits are solid state diodes; the center tap connection of a coil of the signal output transformer is connected to ground; and wherein said synchronized data signal conveying means includes signal converting means receiving two input signal voltage levels and converting the two input signal levels to two corresponding resultant voltages applied at the center tap of the input transformer secondary coil with one at a stabilized voltage level a predetermined level above ground and the other a stabilized voltage level a predetermined level substantially equidistant below ground.

2. The phase script encoding modulator circuit of claim 1 wherein a plurality of series connected diodes are used in each leg of the four leg ring circuit.

3. The phase script encoding modulator circuit of claim 1, wherein said signal converting means includes a signal inverting circuit with a plurality of cascaded transistors; and with the output transistor having voltage stabilizing means for providing a stabilized voltage of one polarity connected to one electrode of the output transistor, and second voltage stabilizing means connected to another electrode of the output transistor for establishing a stabilized voltage of the other polarity.

4. The phase script encoding modulator circuit of claim 3, wherein both said voltage stabilizing means include Zener diodes.

5. The phase script encoding modulator circuit of claim 4, wherein the plurality of transistors are two PNP transistors with the emitter of the output transistor connected to a Zener diode circuit and a positive voltage supply for stabilizing the emitter voltage at a predetermined positive voltage level; and with the collector of the output transistor connected to the other Zener diode in such polarity as to stabilize the collector at a predetermined negative voltage level when the output transistor is in a non-conductive state; and with the output transistor collector connected as the output of the signal converting means circuit to the center tap of the input transformer secondary coil.

6. The phase script encoding modulator circuit of claim 1, wherein said signal connective means to the primary coil of said signal input transformer includes a driver emitter follower circuit for driving the input transformer with a predetermined waveform reference signal, and to minimize output loading of the predetermined waveform signal generating means.

7. The phase script encoding modulator circuit of claim 6, wherein said driver emitter follower circuit includes an output signal level adjustment means; and wherein said predetermined waveform reference signal generating means is a clock periodic waveform reference signal generator.

References Cited

UNITED STATES PATENTS 2,923,894 2/1960 Thompson ---------- 332—47

FOREIGN PATENTS 900,611 7/1962 Great Britain.

ROY LAKE, *Primary Examiner.*

L. J. DAHL, *Assistant Examiner.*